United States Patent [19]
Wilwerding

[11] 4,434,362
[45] Feb. 28, 1984

[54] DISPLACEMENT DEPENDENT LOW CONTRAST DEFAULT

[75] Inventor: Dennis J. Wilwerding, Littleton, Colo.

[73] Assignee: Honeywell Inc., Minneapolis, Minn.

[21] Appl. No.: 311,124

[22] Filed: Oct. 14, 1981

[51] Int. Cl.³ .............................. G01J 1/20
[52] U.S. Cl. ..................... 250/201; 250/204; 354/402
[58] Field of Search .............. 250/201, 204; 354/25

[56] References Cited

U.S. PATENT DOCUMENTS

| | | | |
|---|---|---|---|
| 4,247,762 | 1/1981 | Wilwerding | 250/204 |
| 4,250,377 | 2/1981 | Wilwerding | 250/204 |
| 4,333,077 | 6/1982 | Langlais et al. | 250/201 |
| 4,358,673 | 11/1982 | Wittenberger | 250/204 |
| 4,358,674 | 11/1982 | Frazier | 250/204 |
| 4,358,675 | 11/1982 | Frazier et al. | 250/204 |

Primary Examiner—F. L. Evans
Attorney, Agent, or Firm—Charles J. Ungemach

[57] ABSTRACT

A system for producing a default signal for an auto focus system whenever the scene being viewed has too low a contrast for the system to operate correctly. The default signal is produced as a function of the out of focus condition of the system so that default occurs when the low contrast value is below a first magnitude when the lens is near a proper focus position but occurs near a magnitude less than the first magnitude when the lens is further away from the proper focus position.

28 Claims, 5 Drawing Figures

DISPLACEMENT DEPENDENT LOW CONTRAST DEFAULT

BACKGROUND OF THE INVENTION

In the art of the automatic focusing of cameras, the problem associated with low contrast conditions in the scene being viewed has long been recognized. If the scene being viewed has too low a contrast, then the output signals from the detectors used in the auto focus signal become unreliable for purposes of properly positioning the camera lens at a correct focus position. Accordingly, it has been desired in the past to detect low contrast conditions and provide a means for default when such conditions exist. The default signal either informs the operator that a low contrast condition exists and/or positions the taking lens at the hyperfocal position which position causes a proper focus for many scenes being taken or just inhibiting lens motion.

A common method used for low contrast default is to provide a bias signal set at some predetermined value below which the contrast conditions are assumed to be too low for proper operation. A signal from the auto focus system, which is representative of the actual contrast being viewed, is compared with the bias signal and if the contrast signal falls below the bias signal, the system is caused to default. Examples of prior art default systems may be found in my U.S. Pat. No. 4,247,762 issued Jan. 27, 1981 and U.S. Pat. No. 4,250,377 issued Feb. 10, 1981 as well as in copending applications of James Frazier, Ser. No. 212,930 filed Dec. 4, 1980, now U.S. Pat. No. 4,358,674, of John C. Wittenberger, Ser. No. 212,918 filed Dec. 4, 1980, now U.S. Pat. No. 4,358,673, and of James Frazier et al, Ser. No. 213,437 filed Dec. 5, 1980, now U.S. Pat. No. 4,358,675, all of which are assigned to the assignee of the present invention.

A hitherto unidentified problem occurs in some auto focus systems, particularly those of the "through-the-lens" type, such as is disclosed in a copending application of Richard Langlais et al, Ser. No. 168,225 filed July 10, 1980, now U.S. Pat. No. 4,333,007, and assigned to the assignee of the present invention. In this system, the taking lens of the camera is used to direct radiation to the auto focus sensing circuitry and its position at the time the auto focus signal is determined may be near the proper focus position or quite remote from the proper focus position. When the lens is remote from the proper focus position, the radiation received by the detectors is considerably out of focus and thus inherently provides a rather low contrast image for the detectors to sense. The image falling on the detectors when the lens is near the proper focus position is not so much out of focus and thus produces a greatly increased indication of contrast. Accordingly, if a constant bias signal is used as a gauge to determine whether a low contrast condition exists, the system may default when the lens is far out of the normal focus position even though sufficient contrast may exist when the lens nears the proper focus position. Thus, the low contrast default systems of the prior art might frequently produce a default signal when it was not actually necessary.

SUMMARY OF THE INVENTION

The apparatus of the present invention utilizes a signal indicative of the out-of-focus state of the lens to modify either the bias or reference signal or the signal indicative of contrast to produce a default signal which occurs at different levels depending on the out-of-focus state of the lens and thus reduces the false default signal occurrence. More particularly, when the lens starts initially near the proper focus position, the comparision used to determine whether a low contrast condition exists is at a relatively high level but as the lens is further and further from the proper focus position, the comparison necessary to produce a default decreases thereby allowing for the naturally occurring low contrast which exists in a badly out-of-focus lens and preventing many unnecessary default situations from occurring.

DETAILED DESCRIPTION OF THE PREFERRED EMBODIMENTS

Before progressing into the explanation of the present invention, it will be convenient to briefly discuss the operation of the auto focus circuitry found in the above-mentioned copending application serial No. 168,225. In that application, a plurality of radiation responsive detectors are arranged in groupings wherein a first grouping of detectors receives radiation from the scene being viewed in a first pattern and a second grouping of detectors receives radiation from the scene being viewed in a second pattern. The patterns move with respect to one another as the distance between the object and the system changes. The range is determined from an analysis of the relative position of the patterns by computing where the patterns will coincide if the focussing lens of the system is moved. The process involves taking a series of summations of the signals from the individual detectors with each of the summations being taken as if the lens has moved from one extreme position about its present position through the present position and to an opposite extreme position. Each lens position is assigned an arbitrary number, i, on either side of the present position. The output values, V, of the various summations are stored in a memory and the difference between two adjacent stored values, D, is taken. This difference value, representative of the slope of a curve being generated by the various summation values, is found to have a maximum value $D_m$ when the curve crosses a predicted zero position representative of the predicted proper focus position. The maximum difference value, $D_m$, has also been found to be representative of the predicted contrast condition that would exist if the lens were moved to the predicted proper position. In other words, with greater contrast, the value $D_m$ increases while with less contrast, the value $D_m$ decreases. Accordingly, it is possible to use the value $D_m$ for arbitrarily assigning a value below which low contrast is deemed to exist in order to provide a default signal. However, since the lens through which the radiation is passing may be badly out of focus, the value for $D_m$ may be considerably less than would exist if the lens were near or at the proper focus position. Therefore, if $D_m$ alone were used to determine when a low contrast condition existed, then at badly out of focus conditions, the system might sense a low contrast condition erroneously.

Figure 1:
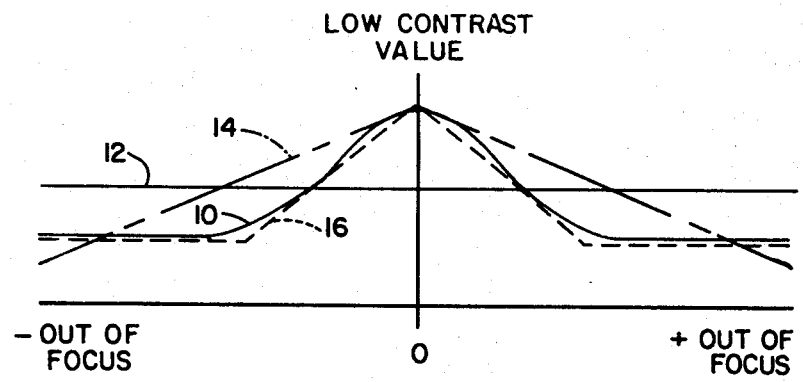
FIG. 1 is a graph showing the variation of the low contrast value with the out of focus condition.

In FIG. 1, the solid line curve 10 is a plot showing the changes of an assumed low contrast value which might occur at various out-of-focus conditions of the lens. If the value $D_m$ is above 10, the sufficient contrast is deemed to exist, while if $D_m$ is below line 10, then the contrast is deemed to be too low and a default signal is desired. The point 0 on the abscissa represents the lens at the proper focus position and it is seen that the low contrast value is fairly high. When the lens is moved out of focus in either the positive or negative direction, the low contrast value beings to diminish along a bell shaped curve and it is seen that in badly out of focus conditions, the low contrast value is considerably lower than is the case at the proper focus position. Accordingly, if a fixed bias signal, such as is shown by solid lin 12, were employed, a low contrast condition would be deemed to exist when the lens was in a far out of focus position even though near and at the proper focus position the low contrast value might be above the bias line 12. Thus, if a constant bias is used, the system would produce false low contrast signals in a number of cases.

To overcome this problem, I have determined that a comparison of the bias voltage and the $D_m$ value should decrease on either side of the proper focus position along a line approximating the curve 10. In actual practice, the exact shape of the bell shaped curve 10 changes somewhat from one scene to another so while it would be desirable to provide a comparsion signal which exactly matched curve 10, for practicality and simplicity, it is better to approximate the curve and achieve a better operation than is obtainable with a straight line bias such as line 12. One example of such a comparsion signal is represented by the dash-dot line 14 which linearly decreases from a high at the 0 or proper focus position to a low at the badly out of focus position on either side. It is seen that line 14 will reduce the number of false low contrast default signals and improves the situation considerably. Nevertheless, it can be seen that there are still certain values of $D_m$ which may fall below the comparison signal at certain out of focus points and still be above the low contrast value at the proper focus position. Accordingly, a signal created along a compound line, such as shown by dash line 16, may be employed. It is seen that line 16 extends from a high at the proper focus position in straight line fashion to a fixed value at a partly out of focus condition and then extends in a more or less horizontal fashion to the badly out of focus position. Curve 16 more closely approximates curve 10 and thus will produce a low contrast default signal only rarely when it should not occur. Of course, as mentioned above, the bell shaped curve 10 may change with different scenes being viewed so perfect operation cannot be obtained with either curve 14 or 16. However, in either case, considerable improvement over the prior art is accomplished.

Figure 2:
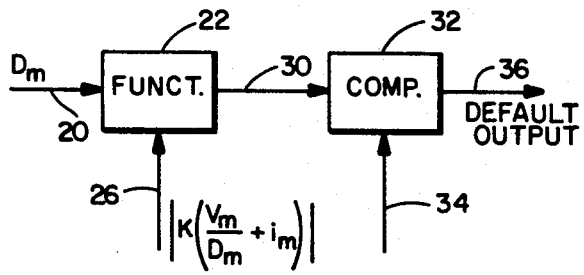
FIG. 2 is a circuit diagram of one embodiment of the present invention.

FIG. 2 shows a circuit which will provide for a decrease level for the low contrast default signal with increasing out of focus conditions. In FIG. 2, an arrow 20 is shown identified with the designation $D_m$ and represents an input signal representative of the maximum slope obtained from the circuitry in the above-referred to copending application Ser. No. 168,225. As discussed above, $D_m$ is related to the actual contrast conditions which exist at a predicted 0 crossover or proper focus position. The signal $D_m$ on input 20 is presented to a function generating circuit in a box 22 designated by "FUNCT". A second arrow 26 is shown leading to box 22 and represents a signal proportional to the number of shifts necessary to bring the lens from its present position to the proper focus position as determined in the circuitry of the above-mentioned copending application serial No. 168,225. The signal on input 26 is shown having an absolute value $|K(V_m/D_m + i_m)|$ where K is a constant of proportionality chosen in accordance with the desired slope of the curve 14 of FIG. 1, $V_m$ is the value of the summation proximate the predicted 0 crossover point or proper focus position from the above-referred to application Ser. No. 168,225 and $i_m$ is the number of shifts, either negative to positive, which the lens must use to go from its present position to approximately the desired focus position. The value $(V_m/D_m + i_m)$ is a value obtained from the circuitry of the above-mentioned copending application Ser. No. 168,225 which predicts the zero crossover point with respect to the present lens position and thus $|K(V_m/D_m + i_m)|$, which is obtained by circuitry for multiplying by K and absolute value circuitry (not shown) from the $(V_m/D_m + i_m)$ signal above, presents to box 22 a signal which varies in a predetermined way with the out-of-focus condition on either side of the proper focus position.

Box 22 operates to modify the $D_m$ signal on input 20 with the out-of-focus signal $|K(V_m/D_m + i_m)$ on input 26 so as to produce a modified $D_m$ signal which varies in magnitude with the out-of-focus condition of the lens to produce a modified output signal as shown by arrow 30. For example, box 22 may add or multiply the value for $D_m$ and the value $K(V_m/D_m + i_m)$ to produce a contrast limit signal on output 30. The contrast limit signal on output 30 is representative of the contrast limit which will be used in determining whether or not to default the system. The contrast limit signal on output 30 is presented as an input to a comparator 32 which has a second input shown by arrow 34 representing the trip point or bias signal of predetermined value below which a default signal should occur. Comparator 32 compares the contrast limit signal on input 30 with the trip point signal on input and if the signal on input 30 is less than that on input 34, a default signal will appear on an output shown by arrow 36 from comparator 32. If the signal on input 30 is greater than the signal on input 34, sufficient contrast is deemed to exist and a predetermined or zero output will appear on arrow 36. With digital circuitry, a "0" may be chosen to represent sufficient contrast and a "1" may be chosen to represent low contrast default.

In can be seen in FIG. 2 that as the out of focus condition increases, the value of the signal on input 26 to box 22 will increase and accordingly the control limit signal on output 30 will, when addition or multiplication is used as the function, also increase. Thus, with increasing amounts of out of focus condition, it will require greater values of the trip point signal on input 34 to produce a default signal. Thus the system will not produce a default signal when the out of focus condition is large unless the control limit signal on output 30 is very small. On the other hand, if the out of focus condition of the lens is not far from the proper focus position, then the control limit signal on output 30 will be smaller and thus if it still falls below the trip point, a default output will occur. The default signal on output 36 may be used to provide an indication to the camera operator that a low contrast condition exists or may be used in the circuitry of the above-mentioned copending application Ser. No. 168,225 to position the taking lens at the hyperfocal position so that a majority of the pictures being taken will still be in focus.

The circuit of FIG. 2 will, when multiplication or division is used as the function, generate a curve such as that shown as dash-dot line 14 in FIG. 1. The slope of the curve will depend upon the value chosen for K and should be adjusted so as to most closely approximate the curve 10. Of course, rather than adjusting the value of $D_m$ in accordance with the signal indicative of the out of focus condition, it would be equally possible to adjust the value of the trip point or bias signal on input 34 as is shown in FIG. 3.

Figure 3:
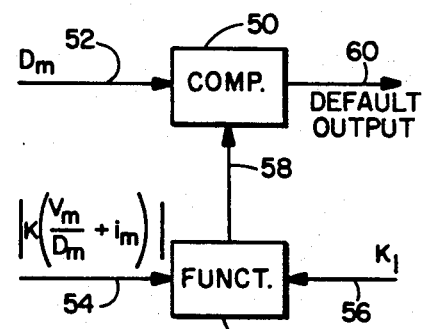
FIG. 3 is a circuit diagram of an alternate embodiment of the present invention.

In FIG. 3, the value $D_m$ is shown being presented to a comparator 50 by an input arrow 52. The out of focus or absolute value $|K(V_m/D_m+i_m)|$ signal is shown leading to a function generating circuit shown by box 52 via an input arrow 54. Box 52 has a second input $K_1$ entering via arrow 56 and the two signals $K_1$ and $|K(V_m/D_m+i_m)|$ are, like in FIG. 1, modified such as by adding or multiplying to produce a modified trip point or bias signal on an output shown by arrow 58 which is used as an input to comparator 50. The values of K and $K_1$ are chosen to produce the desired slope for the curve. Comparator 50 compares the $D_m$ signal on input 52 with the modified trip point or bias signal on input 58 and produces an output default signal shown by arrow 60 whenever the $D_m$ signal is less than the trip point signal.

The apparatus of FIGS. 2 and 3 both produce straight line functions such as is shown by curve 14 in FIG. 1 and, as explained above, do not as closely approximate the bell shaped curve of solid line 10 as may be desired in some applications.

Figure 4:
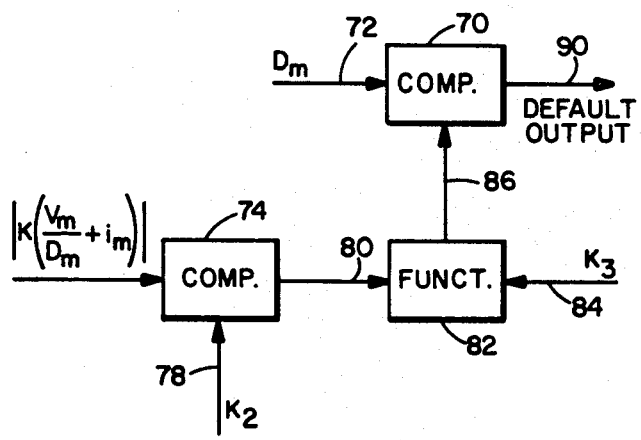
FIG. 4 is another alternate embodiment of the present invention.

When it is desired to produce a curve such as dashed line 16 in FIG. 1, then a circuit such as shown in FIG. 4 may be employed wherein the $D_m$ signal is presented to a comparator 70 by an input shown as arrow 72 and the out of focus or $|K(V_m/D_m+i_m)|$ signal is presented to a comparator 74 by an input shown as arrow 76. Comparator 74 has a second input shown by an arrow 78 and upon which a signal identified as $K_2$ appears. The value $K_2$ is chosen to be of such magnitude that it occurs where the horizontal portion of curve 16 changes between a horizontal line to a rising slope on either side of the "0" point in FIG. 1. In other words, if the change of slope of line 16 were to occur at a position plus or minus 4 indicating that when the lens is more than 4 shift positions away from the proper focus position the change of slope should occur, then $K_2$ would have a value representative of 4. Comparator 74 in FIG. 4 compares the value of $K(V_m/D_m+i_m)$ with the value $K_2$ and produces an output shown by an arrow 80 which is connected as an input to a function generating circuit shown by box 82. The signal on input 80 is representative of $|K(V_m/D_m+i_m)|$ whenever $|K(V_m/D_m+i_m)|$ is less than $K_2$ but is fixed or 0 value whenever $|K(V_m/D_m+i_m)|$ is greater than $K_2$. Thus, when the signal on input 76 shows that the out of focus condition is greater than the predetermined value $K_2$, a fixed value would be sent to the function box 82 in FIG. 4 and would be, for example, added or multiplied with a value $K_3$ from an input shown by an arrow 84. $K_2$ and $K_3$ are chosen so that an output signal from box 82, shown by an arrow 86, is equal to the value desired for the horizontal portion of curve 16 in FIG. 1. On the other hand, whenever the signal on input 76 was less than the value $K_2$, the signal on input 80 similar to that shown on input 54 in FIG. 3 and the signal from the function box 82 on output 86 of FIG. 4 would be like that shown on output 58 in FIG. 3. The signal on output 86 is presented as an input to the comparator 70 where it is compared with the $D_m$ signal on input 72 to produce a default output signal on an output 90 in the same way as in FIG. 3. In this manner, the default signal on a output 90 from the comparator 70 would occur under two different conditions. The first being whenever the out of focus condition was greater than a predetermined amount $K_2$ and the second being whenever the out of focus condition was less than the predetermined amount $K_2$. Again, in FIGS. 3 and 4, the default output would operate with the circuitry of the above-mentioned copending application serial No. 168,225 to either inform the operator of the low contrast condition or to set the taking lens at a hyperfocal position in order to assure that most pictures taken would be in focus or to cease focus information.

The circuit of FIG. 4 is based on the circuit of FIG. 3 where the trip point or bias signal is modified by the out of focus or $|K(V_mD_m+i_m)|$ signal. Of course, the use of a compound curve, such as line 16 in FIG. 1, may be obtained by modifying the $D_m$ signal as was done in FIG. 2. Such a circuit is shown in FIG. 5.

Figure 5:
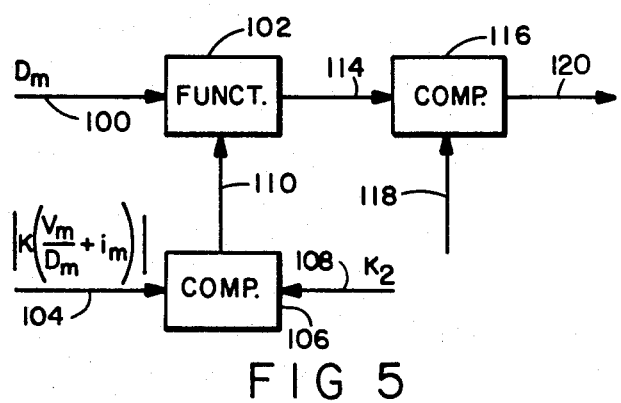
FIG. 5 is yet another alternate embodiment of the present invention.

In FIG. 5, the $D_m$ signal is shown by an arrow 100 as an input to a function generating circuit shown by box 102. As before, the box 102 may produce a signal representative of the sum or product of its inputs or any other function found convenient by those skilled in the art. The out of focus or $|K(V_m/D_m+i_m)|$ signal is shown by an arrow 104 as an input to a comparator 106 which has a second input $K_2$ shown by an arrow 108. As in FIG. 4, comparator 106 wil produce an output shown by an arrow 110 representative of $|K(V_m/D_m+i_m)|$ whenever $|K(V_m/D_m+i_m)|$ is greater than $K_2$ and will produce a constant or zero signal whenever the reverse is true. The output 110 is presented as an input to box 102 and, like in FIG. 2, box 102 will produce a modified $D_m$ output shown by an arrow 114. This output will vary with $|K(V_m/D_m+i_m)|$ for smaller out of focus conditions and will have a predetermined constant value for larger out of focus conditions.

Output 114 is presented as an input to a comparator 116 which has a trip point or bias input shown by arrow 118. Comparator 116 compares the modified $D_m$ signal on input 114 with the trip point signal on input 118 and produces a low contrast default signal output shown by arrow 120 whenever the modified $D_m$ signal on input 114 is less than the trip point signal and produces a predetermined or zero signal at output 120 indicative of sufficient contrast whenever the trip point signal on input 118 is less than the modified $D_m$ signal on input 114. Thus, like in FIG. 4, the low contrast default signal is caused to occur under two different comparison portions of the curve 116. The first when large out of focus conditions occur; i.e., when $|K(V_m/D_m+i_m)|$ is greater than $K_2$ and the second for smaller out of focus conditions; i.e., when $|K(V_m/D_m+i_m)|$ is less than $K_2$.

It is therefore seen that I have provided apparatus for use with an auto focus system to more accurately produce a default signal in the event of low contrast condition in the scene being viewed. Many obvious alterations will occur to those skilled in the art and I do not wish to be limited by the specific disclosures used in connection with the preferred embodiments. I intend only to be limited by the following claims.

The embodiments of the invention in which an exclusive property or right is claimed are defined as follows:

1. Apparatus for producing a low contrast default signal for an auto focus system which system produces a first signal which varies with contrast conditions and a second signal which varies with out-of-focus conditions comprising:

first means producing a third signal of predetermined magnitude;

signal processing means connected to receive the first, second and third signals, the signal processing means operably to modify one of the first and third signals in accordance with the second signal to produce a fourth signal which varies with the second signal and to compare the fourth signal with the other of the first and third signals to produce the low contrast default signal.

2. Apparatus according to claim 1 wherein the signal processing means includes function producing means connected to the system to receive the first and second signals to produce the fourth signal which varies with a function of the first and second signals and includes first comparator means connected to the function to receive the fourth signal and connected to the first means to receive the third signal, the comparator means producing the low contrast default signal whenever the third signal exceeds the fourth signal.

3. Apparatus according to claim 1 wherein the signal processing means includes function producing means connected to the system to receive the second signal and connected to the first means to receive the third signal to produce the fourth signal which varies with a function of the second and third signals and includes first comparator means connected to the function producing means to receive the fourth signal and connected to the system to receive the first signal, the comparator means producing the low contrast default signal whenever the fourth signal exceeds the first signal.

4. Apparatus according to claim 2 wherein the function producing means is an adder.

5. Apparatus according to claim 2 wherein the function producing means is a multiplier.

6. Apparatus according to claim 3 wherein the function producing means is an adder.

7. Apparatus according to claim 3 wherein the function producing means is a multiplier.

8. Apparatus according to claim 1 further including a second means producing a fifth signal of predetermined magnitude and including first comparator means connected to the system to receive the second signal and connected to the second means to receive the fifth signal and operable to transfer the second signal to the signal processing means when the second signal exceeds the fifth signal and to transfer a signal of predetermined magnitude in lieu of the second signal to the signal processing means whenever the fifth signal exceeds the second signal.

9. Apparatus according to claim 8 wherein the signal processing means includes a function producing means connected to the system to receive the first signal and connected to the first comparator means to receive the transferred signal to produce the fourth signal which varies with a function of the first and transferred signals and includes second comparator means connected to the function producing means to receive the fourth signal and connected to the first means to receive the third signal, the second comparator means producing the low contrast default signal whenever the third signal exceeds the fourth signal.

10. Apparatus according to claim 8 wherein the signal processing means includes function producing means connected to the first comparator means to receive the transferred signal and connected to the first means to receive the third signal to produce the fourth signal which varies with a function of the third and transferred signals and includes second comparator means connected to the system to receive the first signal and connected to function producing means to receive the fourth signal, the second comparator means producing the low contrast default signal whenever the fourth signal exceeds the first signal.

11. Apparatus according to claim 9 wherein the function producing means in an adder.

12. Apparatus according to claim 9 wherein the function producing means is a multiplier.

13. Apparatus according to claim 10 wherein the function producing means is an adder.

14. Apparatus according to claim 10 wherein the function producing means is a multiplier.

15. Low contrast default apparatus for use with an auto focus system includes lens means moveable to a position of proper focus with respect to a scene to be focussed upon, the system producing a first signal indicative of the contrast in the scene, and a second signal indicative of the amount the lens means should be moved from the present position to reach the position of proper focus comprising:

first means supplying a third signal of predetermined magnitude;

second means connected to receive the second signal and one of the first and third signals and to produce a fourth signal which varies as a function of the two signals received by the second means; and third means connected to receive the fourth signal and the remaining one of the first and third signals and to produce a low contrast default signal when a predetermined one of the signals received by the third means exceeds the other.

16. Apparatus according to claim 15 wherein the second means receives the second signal and the first signal to produce the fourth signal which varies as a function of the second and first signals and wherein the third means receives the fourth signal and the third signal to produce the low contrast default signal whenever the third signal exceeds the fourth signal.

17. Apparatus according to claim 15 wherein the second means receives the second signal and the third signal to produce the fourth signal which varies as a function of the second and third signals and wherein the third means receives the fourth signal and the first signal to produce the low contrast default signal whenever the fourth signal exceeds the first signal.

18. Apparatus according to claim 16 wherein the fourth signal varies with the sum of the second and first signals.

19. Apparatus according to claim 16 wherein the fourth signal varies with the product of the second and first signals.

20. Apparatus according to claim 17 wherein the fourth signal varies with the sum of the second and third signals.

21. Apparatus according to claim 17 wherein the fourth signal varies with the product of the second and third signals.

22. Apparatus according to claim 15 further including fourth means supplying a fifth signal of predetermined magnitude and including first comparator means connected to the system to receive the second signal and connected to the fourth means to receive the fifth signal, the first comparator means transferring the second signal to the second means whenever the second signal exceeds the fifth signal and transferring a signal of predetermined magnitude to the second means in lieu of the second signal whenever the fifth signal exceeds the second signal, and wherein the fourth signal varies as a function of the transferred signal and one of the first and third signals.

23. Apparatus according to claim 22 wherein the second means receives the first and transferred signals to produce the fourth signal and the third means includes second comparator means to receive the fourth and third signals to produce a low contrast default signal whenever the third signal exceeds the fourth signal.

24. Apparatus according to claim 22 wherein the second means receives the third and transferred signals to produce the fourth signal and the third means includes second comparator means to receive the fourth and first signals to produce a low contrast default signal whenever the fourth signal exceeds the first signal.

25. Apparatus according to claim 23 wherein the fourth signal is indicative of the sum of the first and transferred signals.

26. Apparatus according to claim 23 wherein the fourth signal is indicative of the product of the first and transferred signals.

27. Apparatus according to claim 24 wherein the fourth signal is indicative of the sum of the third and transferred signals.

28. Apparatus according to claim 24 wherein the fourth signal is indicative of the product of the third and transferred signals.

* * * * *